Jan. 13, 1959  J. M. KLIPP ET AL  2,868,557
DISPOSABLE SHOPPER'S CART
Filed Dec. 22, 1954  2 Sheets-Sheet 1
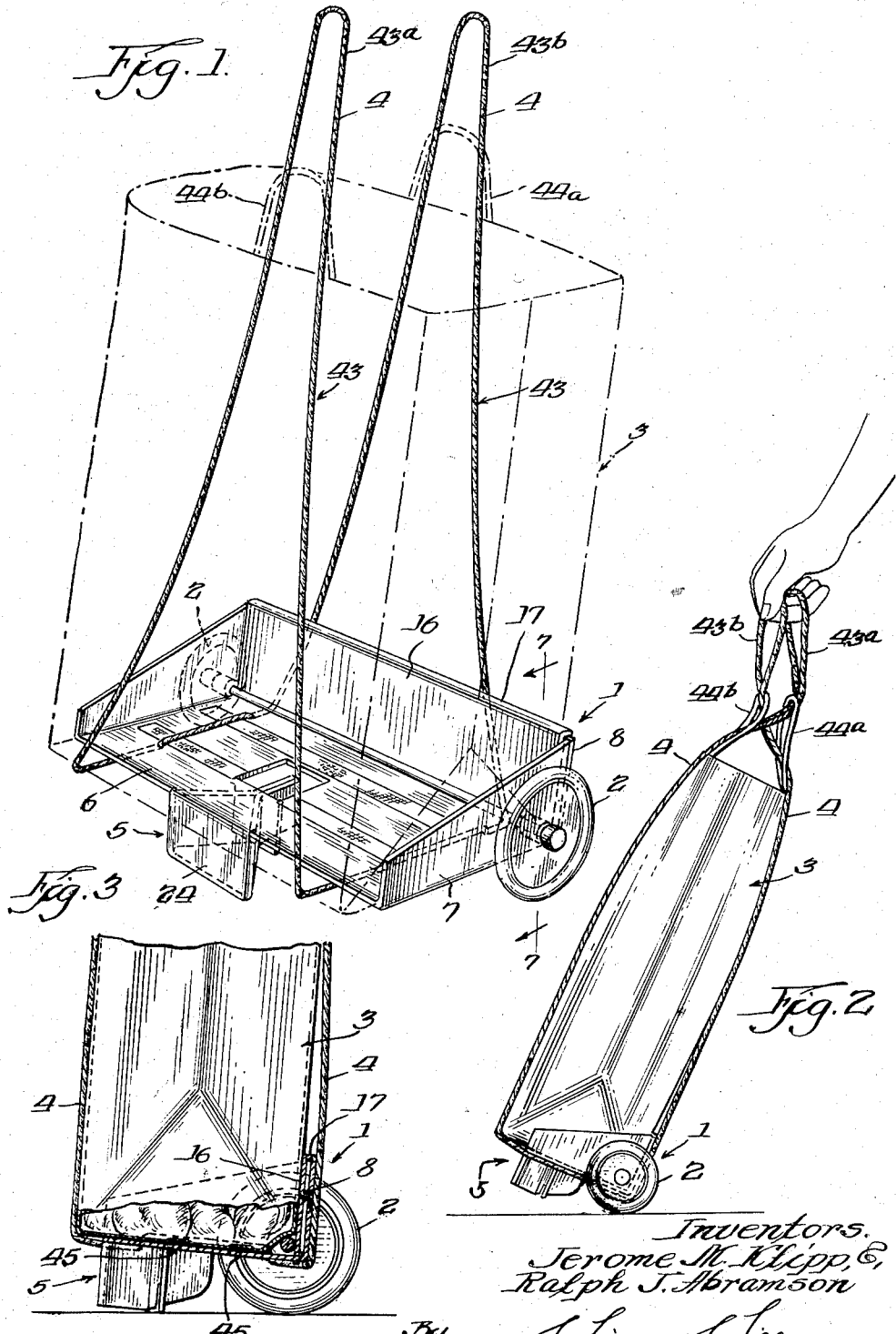
Inventors.
Jerome M. Klipp, &
Ralph J. Abramson
By Lee & Lee
Attys.

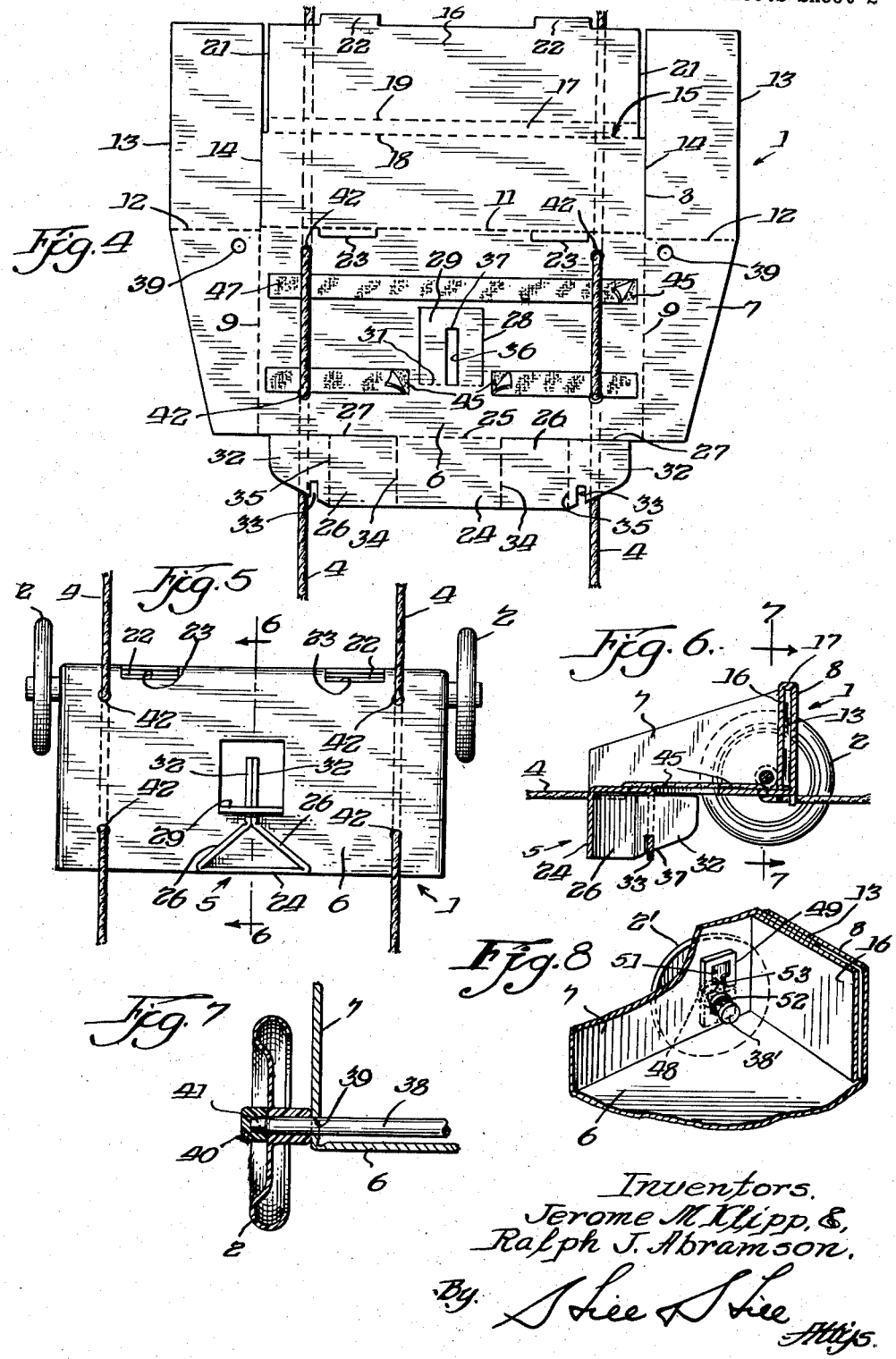

United States Patent Office 2,868,557
Patented Jan. 13, 1959

2,868,557

DISPOSABLE SHOPPER'S CART

Jerome M. Klipp and Ralph J. Abramson, Chicago, Ill.

Application December 22, 1954, Serial No. 476,966

9 Claims. (Cl. 280—47.13)

The invention relates generally to shopping carts, and more particularly to a shopping cart of an expendable type.

The invention has among its objects the production of a shopping cart which may be utilized with a paper shopping bag or the like, either of a standard type or designed for use with the cart, the entire structure being constructed of inexpensive materials whereby the cart may be retailed at a sufficiently attractive price to permit a one-time use, following which the cart may, if desired, be thrown away.

Another object of the invention is the production of such a disposable shopping cart utilizing a very simple design which, for example, may embody a single sheet of corrugated board or other suitable material for the body of the cart, in combination with a suitable wheel structure.

Another object of the invention is the production of such a cart which may be initially fabricated in a disassembled or knock-down form whereby the body portion of the disassembled cart may take the form of a single flat sheet of material, and subsequently assembled at the time of sale or use, thereby permitting shipping and handling in knock-down form, with a resultant saving in packaging and shipping costs.

A further object of the invention is the production of such a cart which may be so designed that the body portion may be readily interlocked during assembly without the utilization of separate fastening elements, adhesive or the like, at the same time providing a very strong and durable construction.

A further object of the invention is the production of such a cart having the above advantages which is also provided with an integral parking leg or the like which may cooperate with the wheels to support the cart and its contents in a stationary position.

A further object of the invention is the production of such a cart which may utilize a novel arrangement of carrying or supporting cords which are so arranged as to provide support for a bag positioned on the cart and at the same time provide handle means by which the cart may be operated or manipulated.

Many other objects and advantages of the construction herein shown and described will be obvious to those skilled in the art from the disclosure herein given.

To this end our invention consists in the novel construction, arrangement and combination of parts herein shown and described and more particularly pointed out in the claims.

In the drawings, wherein like reference characters indicate like or corresponding parts:

Fig. 1 is a perspective view of a cart embodying the present invention with a shopping bag indicated in dotted lines;

Fig. 2 is a side view of a cart and shopping bag carried thereby showing the manner in which the device is operated;

Fig. 3 is a sectional view through the cart and a portion of a shopping bag thereon illustrating the use of the parking leg to support the structure;

Fig. 4 is a plan view of the unfolded blank from which the cart may be formed;

Fig. 5 is a bottom view of the assembled cart illustrating details of the parking leg;

Fig. 6 is a sectional view taken approximately on the line 6—6 of Fig. 5;

Fig. 7 is a sectional view taken approximately on the line 7—7 of Fig. 6; and

Fig. 8 is a perspective view of a modified stub axle construction.

The present invention contemplates the use of a cart structure which may be utilized to support a shopping bag constructed of paper or other suitable material, the latter being either of a standard type commonly employed, or suitably fabricated for use with the cart illustrated, and which may be secured thereto, as for example, by adhesive or the like as an integral part thereof. The cart illustrated is of particular use to shoppers having relatively large bundles and who either do not own the usual type of a shopping cart, or do not have it with them. By means of the present invention, the cart illustrated could be readily purchased at a nominal price sufficiently low to render it practical for the user to dispose of it after its initial use, although if so desired, the cart may be usable more than a single time.

Referring to the drawings and particularly Figs. 1, 2 and 3, the reference numeral 1 indicates generally a body structure constructed of suitable material, as for example, corrugated or other card or fibre board, plastic, etc., having a pair of wheels 2 associated therewith by means of which the cart may be drawn over the ground. As illustrated in Figs. 2 and 3 the body structure 1 may be of a size to receive a shopping bag indicated generally by the numeral 3 and may be provided with a plurality of cords 4 which, as illustrated in Fig. 2, are adapted to support the bag 3 in operable position and at the same time provide handle means which may be grasped by the user to operate the cart. The body structure 1 may also be provided with a downwardly depending leg member indicated generally by the numeral 5 which is adapted to cooperate with the wheels 2 to support the bag 3 in a generally vertical position when the cart is stationary.

Referring more particularly to Figs. 4 through 7, in the embodiment of the invention illustrated the body structure 1 is fabricated from a single sheet of material which is cut to form a flat blank as illustrated in Fig. 4, comprising a generally rectangularly shaped bottom 6 having oppositely disposed integrally connected end walls 7 and a longitudinally extending wall 8. The end walls are adapted to be folded along suitable score lines 9 and the longitudinal wall 8 along a score line 11, whereby such walls may be bent upwardly into planes extending at substantially right angles to that of the bottom 6.

Integrally carried by each of the end walls 7 adjacent the vertical edges 12 thereof are flaps 13, the latter being severed from the longitudinal wall 8 by respective cuts 14 which also define the side or end edges of the wall 8. Carried by the wall 8 and integrally connected therewith along the free longitudinal edge 15 thereof is a flap 16, the latter being operatively connected to the wall 8 by an intermediate strip 17 which is defined by score lines 18 and 19, respectively, the score line 18 defining the top edge of the wall 8 and the line 19 defining the edge of the flap 16.

The distance between the score lines 18 and 19 defining the intermediate portion 17 is approximately equal to the thickness of the material employed and the end edges 21 of the flap 16 may be spaced inwardly with respect to the edges 14 of the wall 8 by approximately the thickness of the material employed. Thus the end walls 7 may be folded upwardly about the score lines 9 with the flaps 13 folded inwardly along the score lines 12 to the positions illustrated in Figs. 1, 5 and 6. If desired, the fold line 11 of the wall 8 may be offset outwardly as viewed in Fig. 4 with respect to the score lines 12 by approximately the thickness of the material to permit easy folding of the parts into the desired relationships, particularly if relatively thick material is employed. The wall 8 may then be folded upwardly and the flap 16 folded around the flaps 13 of the end walls, the latter thus being completely enclosed and in effect locking the end walls 7 in upstanding relationship. The wall 8 and flap 16 may be secured in operative position by any suitable means, as for example, tongues 22 adapted to be inserted into cooperable slots 23 cut in the bottom 6 as illustrated in Figs. 5 and 6. In some cases, it may be desirable to provide adhesive means in place of the flap 16 for securing the flap 13 and wall 8.

The parking leg 5, in the embodiment illustrated, comprises a leg portion 24 integrally connected along a fold line 25 defining the adjacent edge of the bottom 6, the leg 24 being provided with oppositely disposed flaps 26 severed from the bottom 6 by cuts 27.

Severed from the bottom 6 along a U-shaped line 28 is a tongue 29, the latter being adapted to be folded downwardly along the fold line 31 which extends parallel to the fold line 25 at the juncture of the leg member 24 and the bottom 6, whereby the leg member and tongue 29 may be folded downwardly into parallel relation as illustrated in Figs. 5 and 6. As illustrated in Fig. 4, the free ends of the flaps 26 may terminate in generally triangular portions 32, each having a notch 33 formed therein.

In assembling the parking leg structure illustrated, the flaps 26 may be folded inwardly along the fold lines 34 and 35 to the position illustrated in Fig. 5, following which the tongue 29 may be folded down; the tongue being provided with a slot 36 therein of a size to receive the abutting end portions 32 of the flaps 26 with the connecting portion 37 of the tongue 29 entering the aligned notches or slots 33 in the flaps as illustrated in Fig. 6, and thereby interlocking the flaps to the tongue 29 and thus to the bottom 6.

The wheels 2 may be secured to the body structure 1 by any suitable means, as for example, by an axle 38 of suitable material extending through openings 39 in the end walls 7, with the wheels 2 being rotatable on the outer ends of the axle 38 and locked thereon by small cap members 40 which may be secured to the axle 38 by a press fit. If desired, the axle may be provided with tapered ends 41 whereby the caps 40 may be readily wedged on the end of the axle.

The bag 3 is adapted to be supported adjacent its upper end by the cords 4 which may be passed through aligned pairs of openings 42 forming a pair of loops 43 extending upwardly from adjacent the longitudinal edges of the bottom 6. As illustrated in Fig. 2, the upper loop portions 43a and 43b of the loops may be passed through oppositely disposed handles 44a and 44b of the bag 3, whereby the latter are held in closed position and adequate support is provided for the bag. The free loops 43a and 43b provide a convenient handle by means of which the cart may be drawn over the ground. When it is desired to stop movement of the cart, the latter may be rotated from the position illustrated in Fig. 2 to that illustrated in Fig. 3, whereby the parking leg 5 is cooperable with the wheels to support the cart and bag 3 in a generally vertical stationary position.

If desired, the bag 3 may be adhesively or otherwise connected to the bottom 6 by any suitable means, as for example, a layer of adhesive 45 which may be initially applied to the bottom 6 and protected by a suitable removable strip 47. Similarly, in some cases it may be desirable to permanently attach the bag 3 to the bottom 6 by staples or other suitable means.

Figure 8 illustrates a modified axle construction utilizing two stub axles 38' instead of a single axle 38. In this construction each axle 38' may be provided with an integral hub cap 48, illustrated in dotted lines in Fig. 8, with the axle extending through a flat disk wheel 2' and one of the openings 39. Each axle may be locked in position by a clip or other suitable means, as for example the clip 49, illustrated as being formed from plastic or the like and having a generally rectangular opening 51 therein adapted to receive the squared portion 52 of the axle. When assembled, by inserting the squared portion 52 through the slot 53, the clip is positioned adjacent the bottom 6 preventing the axle from turning in the wall 7, as well as preventing withdrawal of the axle, and cooperating with the side wall to maintain the wheel in an operable upright position.

It will be appreciated from the above description that the present invention enables the production of a shopping cart which may be readily manufactured at a comparatively low cost, the embodiment of the invention illustrated comprising a single sheet of corrugated board or other suitable material; an axle, a pair of wheels and securing caps, and a piece of cord. The axle, wheels and caps may be made of any suitable material, as for example, an inexpensive plastic which in quantity may be produced at very low cost, whereby the entire retail price of the device may be considerably less than a dollar. The carts may be stocked in a knock-down form by retail stores and the like, and readily assembled at the time of purchase, the cost being sufficiently low that the cart may be subsequently disposed of after it has served its purpose.

Having thus described our invention, it is obvious that various immaterial modifications may be made in the same without departing from the spirit of our invention; hence, we do not wish to be understood as limiting ourselves to the exact form, construction, arrangement and combination of parts herein shown and described, or uses mentioned.

What we claim as new and desire to secure by Letters Patent is:

1. A disposable shopper's cart formed from a single sheet of relatively stiff material comprising an elongated, planar, generally rectangular base member of a size to receive the bottom portion of a shopping bag and support the same, a pair of end wall portions integrally connected to and extending transversely from said base member adjacent respective end edges of the latter, a longitudinal wall integrally connected to and extending transversely from said base member, interlocking means associated with said longitudinal and end walls for retaining the same in operative relation, a pair of wheels positioned adjacent respective ends of said base member and rotatable about an axis extending substantially parallel to the plane of said base member and intersecting said end walls, and a plurality of cords extending upwardly from said cart at opposite sides of a shopping bag positioned on the base member, operative to provide support for the upper portion of such a shopping bag and handle means for operating the cart.

2. A disposable shopper's cart comprising a body structure formed from a single sheet of relatively stiff material, said sheet being cut to form a generally rectangular bottom having integrally connected end walls and a longitudinal wall, said walls being folded along their junctures with the bottom into upstanding relation with respect thereto, each end wall having a flap folded inwardly adjacent the longitudinal wall, means for retaining said longitudinal and end walls in operative upstanding position to form a rigid structure, axle means extending outwardly from each end wall adjacent the juncture of the bottom and said longitudinal wall, a pair of wheels carried by said axle means, rotatable on an axis extending substantially parallel to said last-mentioned juncture, a leg member integrally connected to said bottom adjacent the opposite longitudinal edge thereof, and folded downwardly relative to the bottom wall, the latter having a tongue cut therefrom and folded downwardly into substantially parallel relation with respect to said leg member, a pair of oppositely directed laterally extending flaps carried by said leg member and folded inwardly beneath the bottom wall with the free end portions brought into abutting relation, said tongue having a slot therein adapted to receive the free end portions of said flaps, said leg member being cooperable with said wheels for supporting said base member in a stationary generally horizontal position, and a plurality of cords extending upwardly from said body structure at opposite sides thereof operative to provide support for the upper portion of a shopping bag positioned on said bottom and forming handle means for operating the cart.

3. A disposable shopper's cart comprising a body structure formed from a single sheet of relatively stiff material, said sheet being cut to form a generally rectangular bottom having integrally connected end walls and a longitudinal wall, said walls being folded along their junctures with the bottom into upstanding relation with respect thereto, each end wall having a flap folded inwardly adjacent the longitudinal wall, means for retaining said longitudinal and end walls in operative upstanding position to form a rigid structure, axle means extending outwardly from each end wall adjacent the juncture of the bottom and said longitudinal wall, a pair of wheels carried by said axle means, rotatable on an axis extending substantially parallel to said last-mentioned juncture, a leg member integrally connected to said bottom adjacent the opposite longitudinal edge thereof, and folded downwardly relative to the bottom wall, the latter having a tongue cut therefrom and folded downwardly into substantially parallel relation with respect to said leg member, and a pair of oppositely directed laterally extending flaps carried by said leg member and folded inwardly beneath the bottom wall with the free end portions brought into abutting relation, said tongue having a slot therein for receiving the free end portions of said flaps, said leg member being cooperable with said wheels for supporting said base member in a stationary generally horizontal position.

4. A disposable shopper's cart comprising a body structure formed from a single sheet of relatively stiff material, rotatable supporting wheels operatively carried by said body structure, a leg member integrally connected to said bottom adjacent the opposite longitudinal edge thereof, and folded downwardly relative to the bottom wall, the latter having a tongue cut therefrom folded downwardly into substantially parallel relation with respect to said leg member, a pair of oppositely directed laterally extending flaps carried by said leg member and folded inwardly beneath the bottom wall with the free end portions brought into abutting relation, said tongue having a slot therein for receiving the free end portions of said flaps, said leg member being cooperable with said wheels for supporting said base member in a stationary generally horizontal position, and means providing support for the upper portion of a shopping bag positioned on said bottom and forming handle means for operating the cart.

5. A disposable shopper's cart comprising a body structure formed from a single sheet of relatively stiff material, rotatable supporting wheels operatively carried by said body structure, a leg member integrally connected to said bottom adjacent the opposite longitudinal edge thereof, and folded downwardly relative to the bottom wall, the latter having a tongue cut therefrom folded downwardly into substantially parallel relation with respect to said leg member, a pair of oppositely directed laterally extending flaps carried by said leg member and folded inwardly beneath the bottom wall with the free end portions brought into abutting relation, and means for securing said end portions to said tongue, said leg member being cooperable with said wheels for supporting said base member in a stationary generally horizontal position, and means providing support for the upper portion of a shopping bag positioned on said bottom and forming handle means for operating the cart.

6. A disposable shopper's cart comprising a body structure formed from a single sheet of relatively stiff material, said sheet being cut to form a generally rectangular bottom having integrally connected end walls and a longitudinal wall, said walls being folded along their junctures with the bottom into upstanding relation with respect thereto, each end wall having a flap folded inwardly adjacent the longitudinal wall, the latter having a longitudinally extending flap of a length to be folded inwardly around said end wall flaps to form a rigid structure, means for retaining said longitudinal flap in operative position, axle means extending outwardly from each end wall adjacent the juncture of the bottom and said longitudinal wall, a pair of wheels carried by said axle means, rotatable on an axis extending substantially parallel to said last-mentioned juncture, a leg member integrally connected to said bottom wall adjacent the opposite longitudinal edge thereof, and folded downwardly relative to the bottom wall, the latter having a tongue cut therefrom folded downwardly into substantially parallel relation with respect to said leg member, a pair of oppositely directed laterally extending flaps carried by said leg member and folded inwardly beneath the bottom wall with the free end portions brought into abutting relation, said tongue having a slot therein for receiving the free end portions of said flaps, said leg member being cooperable with said wheels for supporting said base member in a stationary generally horizontal position, and a plurality of cords extending upwardly from said body structure at opposite sides thereof and adapted to provide support for the upper portion of a shopping bag positioned on said bottom and forming handle means for operating the cart.

7. A disposable shopper's cart comprising a body structure formed from a single sheet of relatively stiff material, said sheet being cut to form a generally rectangular bottom having integrally connected end walls and a longitudinal wall, said walls being folded along their junctures with the bottom into upstanding relation with respect thereto, each end wall having a flap folded inwardly adjacent the longitudinal wall, the latter having a longitudinally extending flap of a length to be folded inwardly around said end wall flaps, said bottom having a plurality of openings therein adjacent said longitudinal wall, a plurality of tongues extending outwardly from the free longitudinal edge of said longitudinal flap, each tongue being inserted into a respective opening to interlock said walls into a rigid structure, rotatable supporting wheels operatively carried by said body structure, a leg member integrally connected to said bottom adjacent the opposite longitudinal edge thereof, and folded downwardly relative to the bottom wall, the latter having a tongue cut therefrom and folded downwardly into substantially parallel relation with respect to said leg member, a pair of oppositely directed laterally extending flaps carried by said leg member and folded inwardly beneath the bottom wall with the free end portions brought into abutting relation, said tongue having a slot therein for receiving the free end portions of said flaps, the latter each having a notch thereon for receiving a portion of said tongue whereby the latter and said flaps may be interlocked in operative position, said leg member being cooperable with said wheels for supporting said base member in a stationary generally horizontal position, and means extending upwardly from said body structure at opposite sides thereof providing support for the upper portion of a shopping bag positioned on said bottom and forming handle means for operating the cart.

8. A disposable shopper's cart comprising a body structure formed from a single sheet of relative stiff material, said sheet being cut to form a generally rectangular bottom having integrally connected end walls and a longitudinal wall, said walls being folded along their junctures with the bottom into upstanding relation with respect thereto, each end wall having a flap folded inwardly adjacent the longitudinal wall, the latter having a longitudinally extending flap of a length to be folded inwardly around said end wall flaps, said bottom having a plurality of openings therein adjacent said longitudinal wall, a plurality of tongues extending outwardly from the free longitudinal edge of said longitudinal flap, each tongue being inserted into a respective opening to interlock said walls into a rigid structure, rotatable supporting wheels operatively carried by said body structure, a leg member integrally connected to said bottom adjacent the opposite longitudinal edge thereof, and folded downwardly relative to the bottom wall, the latter having a tongue cut therefrom and folded downwardly into substantially parallel relation with respect to said leg member, and a pair of oppositely directed laterally extending flaps carried by said leg member and folded inwardly beneath the bottom wall with the free end portions brought into abutting relation, said tongue having a slot therein for receiving the free end portions of said flaps, the latter each having a notch thereon for receiving a portion of said tongue whereby the latter and said flaps may be interlocked in operative position, said leg member being cooperable with said wheels for supporting said base member in a stationary generally horizonal position.

9. A disposable shopper's cart comprising a body structure formed from a single sheet of relatively stiff material, said sheet being cut to form a generally rectangular bottom having integrally connected end walls and a longitudinal wall, said walls being folded along their junctures with the bottom into upstanding relation with respect thereto, each end wall having a flap folded inwardly adjacent the longitudinal wall, the latter having a longitudinally extending flap of a length to be folded inwardly around said end wall flaps to form a rigid structure, means for retaining said longitudinal flap in operative position, a stub axle extending outwardly from each end wall adjacent the juncture of the bottom and said longitudinal wall, each axle terminating in an enlarged hub cap and having a notched portion adjacent its inner end, a clip member constructed to snap on said notched portion operative to retain said axle and wheels in operative position, a wheel carried by said axles, a leg member integrally connected to said bottom wall adjacent the opposite longitudinal edge thereof, and folded downwardly relative to the bottom wall, the latter having a tongue cut therefrom and folded downwardly into substantially parallel relation with respect to said leg member, a pair of oppositely directed laterally extending flaps carried by said leg member and folded inwardly beneath the bottom wall with the free end portions brought into abutting relation, said tongue having a slot therein for receiving the free end portions of said flaps, said leg member being cooperable with said wheels for supporting said base member in a stationary generally horizontal position, and a plurality of cords extending upwardly from said body structure at opposite sides thereof to provide support for the upper portion of a shopping bag positioned on said bottom and forming handle means for operating the cart.

References Cited in the file of this patent
UNITED STATES PATENTS

| | | |
|---|---|---|
| 1,554,034 | Richie | Sept. 15, 1925 |
| 2,459,865 | Bourne | Jan. 25, 1949 |
| 2,465,847 | Coffey | Mar. 29, 1949 |
| 2,482,848 | Grant | Sept. 27, 1949 |
| 2,563,145 | Winkler | Aug. 7, 1951 |
| 2,648,959 | Budzyna | Aug. 18, 1953 |